(12) United States Patent
Yi

(10) Patent No.: US 12,745,275 B2
(45) Date of Patent: Sep. 22, 2026

(54) COMMUNICATION METHOD AND APPARATUS

(71) Applicant: Huawei Technologies Co., Ltd., Shenzhen (CN)

(72) Inventor: Xiongshu Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 18/590,327

(22) Filed: Feb. 28, 2024

(65) Prior Publication Data

US 2024/0205950 A1 Jun. 20, 2024

Related U.S. Application Data

(63) Continuation of application No. PCT/CN2022/112170, filed on Aug. 12, 2022.

(30) Foreign Application Priority Data

Aug. 31, 2021 (CN) ........................ 202111014921.X

(51) Int. Cl.
*H04W 72/52* (2023.01)
*H04L 5/00* (2006.01)

(52) U.S. Cl.
CPC ............ *H04W 72/52* (2023.01); *H04L 5/001* (2013.01); *H04L 5/0096* (2013.01)

(58) Field of Classification Search
CPC . H04W 72/52; H04W 72/04; H04W 72/0453; H04W 72/1268; H04L 5/001; H04L 5/0096; H04L 5/0098; H04L 5/003
See application file for complete search history.

(56) References Cited

U.S. PATENT DOCUMENTS

2013/0010732 A1* 1/2013 Kawasaki ............ H04W 72/20 370/329
2018/0249475 A1 8/2018 Kronestedt et al.
2018/0309533 A1* 10/2018 Yoshimoto ........ H04W 72/0453
2021/0111497 A1* 4/2021 An ...................... H04B 1/0064

FOREIGN PATENT DOCUMENTS

CN 106685465 A 5/2017
EP 2566246 B1 * 8/2021 ...... H04W 36/00692

* cited by examiner

*Primary Examiner* — Dady Chery
(74) *Attorney, Agent, or Firm* — Slater Matsil, LLP

(57) ABSTRACT

This application provides example communication methods and apparatuses. Embodiments include a network device that determines a frequency band of a first radio on chip from a second frequency band and a third frequency band based on at least one of a first frequency band, uplink load, or an uplink resource. The first frequency band is a frequency band corresponding to a first component carrier of a terminal apparatus, the second frequency band is the same as a frequency band of a second radio on chip, and the uplink resource is used to carry a radio signal of the terminal apparatus. The network device may further receive the radio signal from the terminal apparatus through the first radio on chip and the second radio on chip.

20 Claims, 3 Drawing Sheets

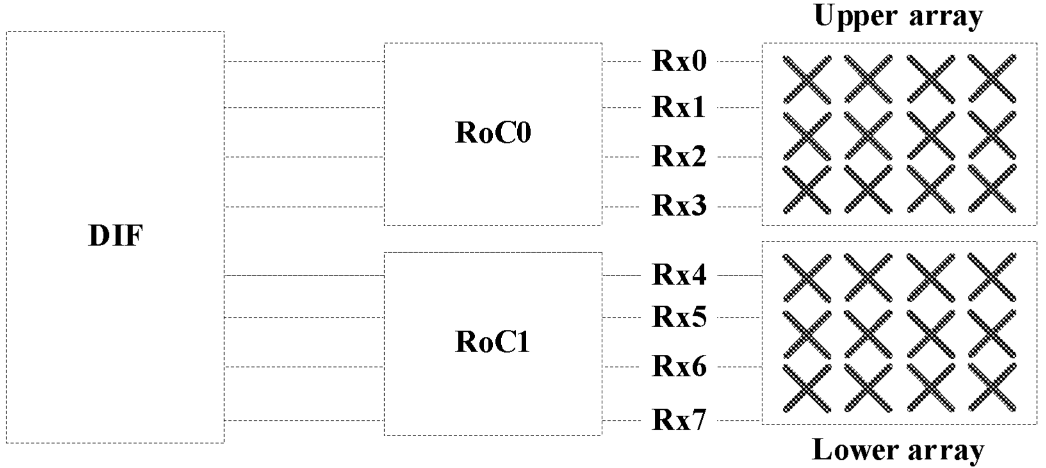
FIG. 3
S101: A network device determines a frequency band of a first radio on chip from a second frequency band and a third frequency band based on uplink load of a first frequency band and/or uplink load of the second frequency band
S102: The network device receives a radio signal from a first terminal apparatus through the first radio on chip and a second radio on chip
FIG. 4
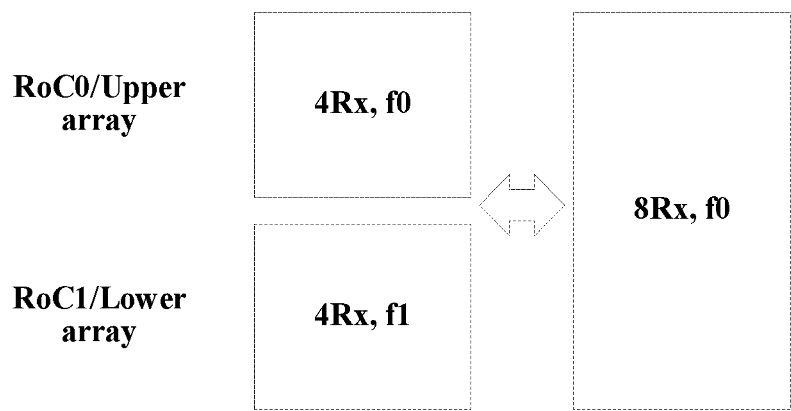
FIG. 5

COMMUNICATION METHOD AND APPARATUS

CROSS-REFERENCE TO RELATED APPLICATIONS

This application is a continuation of International Application No. PCT/CN2022/112170, filed on Aug. 12, 2022, which claims priority to Chinese Patent Application No. 202111014921.X, filed on Aug. 31, 2021. The disclosures of the aforementioned applications are incorporated herein by reference in these entireties.

TECHNICAL FIELD

This application relates to the field of mobile communication technologies, and in particular, to a communication method and apparatus.

BACKGROUND

To increase a capacity of a user and a communication rate of a terminal device in a communication system, a millimeter wave spectrum is introduced into a 5th generation mobile communication technology (5G) new radio (NR) system. The millimeter wave spectrum has a large bandwidth and a high data transmission rate. The transmission rate is up to 40 times a transmission rate of a bandwidth of 20 MHz in a 4th generation mobile communication technology (4G) long term evolution (LTE) system.

Currently, the millimeter wave bandwidth is gradually expanded. For example, in Thailand, the millimeter wave bandwidth has reached 1.2 gigahertz (GHz). In such background, an architecture of splicing a plurality of arrays to form a large bandwidth becomes normal. Each array includes a plurality of antenna elements, and each array may operate independently. In a current multi-array design, an operating frequency band of each array is fixed. If a part of the plurality of arrays can support an operating frequency band required by UE, other arrays are idle. In a signal reception process, a base station cannot obtain an array gain through the idle array. Consequently, receiving performance degrades.

SUMMARY

This application provides a communication method and apparatus, to improve receiving performance of an array antenna in a multi-array design.

According to a first aspect, this application provides a communication method, and the method may be applied to a network device. The network device is, for example, a base station or a BBU in the base station. The method includes: The network device determines a frequency band of a first radio on chip from a second frequency band and a third frequency band based on at least one of a first frequency band, uplink load, or an uplink resource, where the first frequency band is a frequency band corresponding to a first component carrier of a terminal apparatus, the second frequency band is the same as a frequency band of a second radio on chip, the third frequency band is different from the second frequency band, and the uplink resource is used to carry a radio signal of the terminal apparatus. The network device may further receive the radio signal from the terminal apparatus through the first radio on chip and the second radio on chip.

According to the method, the network device may determine the frequency band of the first radio on chip based on at least one of the first frequency band, the uplink load, or the uplink resource, where the frequency band of the first radio on chip may be the second frequency band or the third frequency band, the second frequency band is the same as the frequency band of the second radio on chip, and the second frequency band is different from the third frequency band. Therefore, the frequency band of the first radio on chip can be flexibly switched, to prevent an array corresponding to the first radio on chip from being in an idle state and improve receiving performance of an array antenna in a multi-array design.

In a possible design, when the first frequency band belongs to the second frequency band, and the uplink load does not exceed a threshold, the network device may determine that the frequency band of the first radio on chip is the second frequency band. The uplink load is uplink load of the network device. When the network device performs uplink reception through the second frequency band, the uplink load is uplink load of the second frequency band. When the network device performs uplink reception through the second frequency band and the third frequency band, the uplink load is uplink load of a combination of the second frequency band and the third frequency band.

In this design, when the uplink load of the second frequency band does not exceed the threshold, a carrier of the first radio on chip is configured as the second frequency band. The radio signal is received through an array corresponding to the first radio on chip and an array corresponding to the second radio on chip, so that an array gain can be increased and better transmission experience can be obtained.

In a possible design, the uplink load is uplink load of a combination of the second frequency band and the third frequency band. When a part or all of frequencies in the first frequency band do not belong to the second frequency band, and the uplink load does not exceed a threshold, the network device may determine that the frequency band of the first radio on chip is the second frequency band. The network device may further send first information to the terminal apparatus, where the first information is used to switch the terminal apparatus from the first component carrier to a second component carrier, and a frequency band corresponding to the second component carrier is the second frequency band.

In this design, when the uplink load of the combination of the second frequency band and the third frequency band does not exceed the threshold, if a frequency band of the terminal apparatus does not belong to the second frequency band, the terminal apparatus is preferentially switched to a component carrier corresponding to the second radio on chip, so that the frequency band of the terminal apparatus belongs to the second frequency band. In addition, a carrier of the first radio on chip is configured as the second frequency band. The radio signal is received through an array corresponding to the first radio on chip and an array corresponding to the second radio on chip, so that an array gain can be increased and better transmission experience can be obtained. If a plurality of terminal apparatuses separately access different arrays, for example, one terminal apparatus accesses a component carrier corresponding to the second frequency band, and one terminal apparatus accesses a component carrier corresponding to the third frequency band, and if the uplink load of the combination of the second frequency band and the third frequency band does not exceed the threshold, the network device may switch the terminal apparatus that accesses the third frequency band to accessing the second frequency band, and configure the carrier of the first radio on chip as the second frequency band. Therefore, the uplink radio signal is received on the second frequency band through the first radio on chip and the second radio on chip, to increase the array gain and obtain better communication performance.

In a possible design, there are a plurality of terminal apparatuses. If the uplink resource in a first time unit belongs to the second frequency band, the network device may determine that the frequency band of the first radio on chip in the first time unit is the second frequency band. The network device may receive the radio signal from the terminal apparatus through the first radio on chip and the second radio on chip in the first time unit.

In this design, when at least one terminal apparatus performs uplink transmission through the second frequency band in the first time unit, and/or when no terminal apparatus performs uplink transmission through the third frequency band, the network device may set the frequency band of the first radio on chip as the second frequency band, and receives the uplink radio signal on the second frequency band through the first radio on chip and the second radio on chip in the first time unit, to increase an array gain and obtain better communication performance.

In a possible design, the network device may set the frequency band of the first radio on chip as the second frequency band using an antenna in package chip.

In a possible design, when a first condition is met, the network device may determine primary component carriers and activated component carriers of a plurality of terminal apparatuses from component carriers corresponding to the second frequency band. The first condition includes that a quantity of terminal apparatuses that have connected to the network device does not exceed a specified value, and/or the uplink load of the network device does not exceed the threshold. For example, the second frequency band corresponds to four CCs, and the network device may determine, from the four CCs, a primary component carrier and/or an activated component carrier of each terminal apparatus that requests to connect to the network device.

In this design, the network device can preferentially configure the primary component carrier and the activated component carrier of the terminal apparatus from the component carriers corresponding to the second frequency band, so that the terminal apparatus preferentially performs uplink transmission through the second frequency band.

According to a second aspect, an embodiment of this application provides a communication apparatus, configured to implement a function implemented by the network device in any one of the first aspect or the possible designs of the first aspect. The network device may include corresponding functional modules, respectively configured to implement the steps in the foregoing method. The function may be implemented by hardware, or may be implemented by hardware executing corresponding software. The hardware or the software includes one or more modules corresponding to the functions, method steps, or operations in any one of the foregoing aspect and the designs of the foregoing aspect.

For example, the apparatus includes a processing module and a transceiver module. The processing module may be configured to determine a frequency band of a first radio on chip from a second frequency band and a third frequency band based on at least one of a first frequency band, uplink load, or an uplink resource, where the first frequency band is a frequency band corresponding to a first component carrier of a terminal apparatus, the second frequency band is the same as a frequency band of a second radio on chip, the third frequency band is different from the second frequency band, and the uplink resource is used to carry a radio signal of the terminal apparatus. The transceiver module may be configured to receive the radio signal from the terminal apparatus through the first radio on chip and the second radio on chip.

In a possible design, when the first frequency band belongs to the second frequency band, and the uplink load does not exceed a threshold, the processing module may determine that the frequency band of the first radio on chip is the second frequency band.

In a possible design, the uplink load is uplink load of a combination of the second frequency band and the third frequency band. When a part or all of frequencies in the first frequency band do not belong to the second frequency band, and the uplink load does not exceed a threshold, the processing module may determine that the frequency band of the first radio on chip is the second frequency band. The transceiver module may further send first information to the terminal apparatus, where the first information is used to switch the terminal apparatus from the first component carrier to a second component carrier, and a frequency band corresponding to the second component carrier is the second frequency band.

In a possible design, there are a plurality of terminal apparatuses. If the uplink resource in a first time unit belongs to the second frequency band, the processing module may determine that the frequency band of the first radio on chip in the first time unit is the second frequency band. The transceiver module may receive the radio signal from the terminal apparatus through the first radio on chip and the second radio on chip in the first time unit.

In a possible design, the processing module may set the frequency band of the first radio on chip as the second frequency band using an antenna in package chip.

In a possible design, when a first condition is met, the processing module may determine primary component carriers and activated component carriers of a plurality of terminal apparatuses from component carriers corresponding to the second frequency band. The first condition includes that a quantity of terminal apparatuses that have connected to the network device does not exceed a specified value, and/or the uplink load of the network device does not exceed the threshold.

For example, if the network device is a BBU, the transceiver module may include an interface used for communication between the BBU and an AAU. If the network device is a base station including an AAU, the transceiver module may include the AAU.

Optionally, the communication apparatus may include a processor and/or a transceiver. The processor may be configured to implement a function of the processing module, and the transceiver may be configured to implement a function of the transceiver module. The communication apparatus may further include a memory, configured to store program instructions and data that are required by the processor.

According to a third aspect, an embodiment of this application provides a computer-readable storage medium, including program instructions. When the program instructions are run on a computer, the computer is enabled to perform the method implemented by the network device in any one of the first aspect or the possible designs of the first aspect.

According to a fourth aspect, an embodiment of this application provides a computer program product. When the computer program product runs on a computer, the computer is enabled to perform the method implemented by the network device in any one of the first aspect or the possible designs of the first aspect.

According to a fifth aspect, an embodiment of this application provides a chip. The chip may be coupled to a memory, and may be configured to execute program instructions in the memory, to implement the method in any one of the first aspect and the possible designs of the first aspect in embodiments of this application. "Coupling" means that two components are directly or indirectly combined with each other. For example, coupling may mean that the two components are electrically connected.

For technical effects brought by any one of the possible designs in the second aspect to the fifth aspect, refer to descriptions of technical effects brought by any one of the possible designs in the first aspect. Details are not described herein again.

BRIEF DESCRIPTION OF THE DRAWINGS

FIG. 3 is a schematic diagram of a structure of another network device according to this application;

FIG. 4 is a schematic flowchart of a communication method according to this application;

FIG. 5 is a schematic diagram of a frequency band switching effect according to this application;

DETAILED DESCRIPTION OF ILLUSTRATIVE EMBODIMENTS

The following describes technical solutions in embodiments of this application with reference to the accompanying drawings in embodiments of this application.

To clearly describe the technical solutions in embodiments of this application, words such as "first" and "second" are used in embodiments of this application to distinguish between same items or similar items that have basically the same functions or purposes. For example, first information and second information are merely used to distinguish between different information, and do not limit a sequence of the first information and the second information. A person skilled in the art may understand that the terms such as "first" and "second" do not limit a quantity or an execution sequence, and the terms such as "first" and "second" do not indicate a definite difference.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items" or a similar expression thereof indicates any combination of these items, including a single item or any combination of a plurality of items. For example, at least one item of a, b, or c may represent a, b, c, a and b, a and c, b and c, or a, b, and c, where a, b, and c may be singular or plural.

To facilitate understanding of a communication method provided in embodiments of this application, the following describes a system architecture and an application scenario of the communication method provided in embodiments of this application. It may be understood that the system architecture and the application scenario described in embodiments of this application are intended to describe the technical solutions in embodiments of this application more clearly, and do not constitute a limitation on the technical solutions provided in embodiments of this application.

Embodiments of this application provide a communication method, to improve receiving performance of an array antenna in a multi-array design. The method may be implemented by a network device. The network device is, for example, an access network (AN) device. The access network device may include but is not limited to a next generation base station (gNB) in 5G, an evolved NodeB (eNB) in LTE, a baseband unit (BBU), a transmission and reception point (TRP), a transmission point (TP), or a mobile switching center, or may be an evolved NB (eNB or eNodeB) in LTE, or may be a base station device in a future 5G network or an access network device in a future evolved PLMN network, or may be a wearable device or a vehicle-mounted device.

Figure 1:
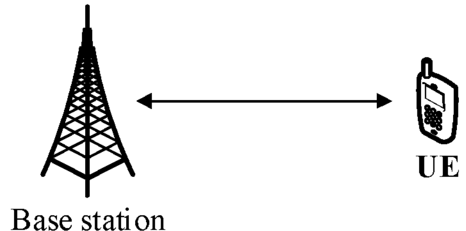
FIG. 1 is a schematic architectural diagram of a wireless communication system according to this application.

As shown in FIG. 1, the network device may be a base station, and may be configured to communicate with a terminal apparatus, namely, UE. Communication between the terminal apparatus and the network device may be performed through an air interface. For example, air interface signaling and data such as a radio resource control (RRC) message and downlink control information (DCI) are transmitted between the terminal apparatus and the network device through the air interface.

In this application, the terminal apparatus may be a terminal device or a component of the terminal device. In this application, the terminal device may also be referred to as UE, a mobile station (MS), a mobile terminal (MT), or the like. The terminal device is a device that provides voice or data connectivity for a user, or may be an internet of things device. For example, the terminal device includes a handheld device, a vehicle-mounted device, or the like that has a wireless connection function. Currently, the terminal device may be a mobile phone, a tablet computer, a notebook computer, a palmtop computer, a mobile internet device (MID), a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like.

It should be understood that the access network device may further communicate with another network device through an interface. The access network device may communicate with another access network device through an interface between the access network devices; and/or the access network device may communicate with a core network device through an interface between the access network device and the core network device, for example, receive data from a core network. A manner of communication between the access network device and another network device is not specifically limited in this application.

Because embodiments of this application mainly relate to the access network device, the network device described in the following is the access network device unless otherwise specified. In the following, a base station may be used to represent a network device and/or an access network device.

Figure 2A:
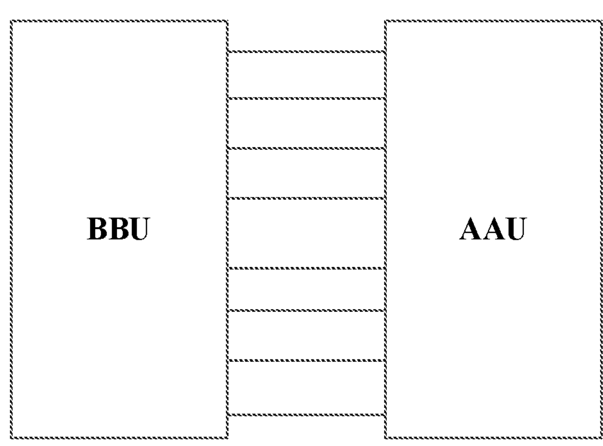
FIG. 2A is a schematic diagram of a structure of a network device according to this application.

As shown in FIG. 2A, the network device may include an active antenna unit (AAU) and a baseband unit (BBU). The BBU is responsible for processing a baseband digital signal, and the AAU is mainly configured to perform analog-to-digital conversion (ADC)/digital-to-analog conversion (DAC). Uplink transmission is used as an example. The AAU may be configured to: receive a radio frequency signal from a terminal apparatus through an antenna, obtain an analog signal after processing the radio frequency signal, convert the analog signal into a baseband digital signal through ADC, and deliver the baseband digital signal to the BBU for processing.

Figure 2B:
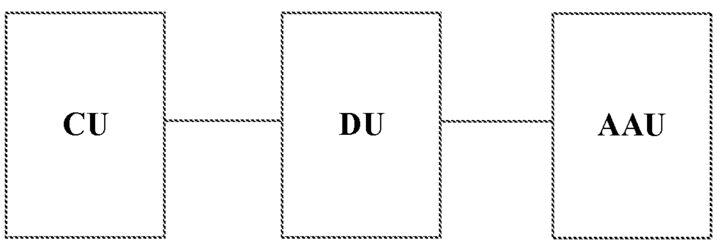
FIG. 2B is a schematic diagram of a structure of another network device according to this application.

In some other deployment manners, as shown in FIG. 2B, the network device may include a central unit (CU) and a distributed unit (DU). The network device may further include an AAU. The CU implements a part of functions of the network device, and the DU implements a part of functions of the network device. For example, the CU is responsible for processing a non-real-time protocol and service, and implements functions of a RRC layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements a part of physical layer processing functions, radio frequency processing, and a function related to an active antenna. Information at the RRC layer eventually becomes information at the PHY layer, or is converted from the information at the PHY layer. Therefore, in the architecture, higher layer signaling, for example, RRC layer signaling, may also be considered as being sent by the DU or sent by the DU and the AAU. It may be understood that the network device may be a device including one or more of the following: a CU node, a DU node, and an AAU node. In addition, the CU may be classified into a network device in a radio access network (RAN), or the CU may be classified into a network device in a core network (CN). This is not limited in this application. An action performed by the BBU in this application may also be performed by the CU and/or the DU.

In this application, an array antenna of the network device may use a multi-array design. For example, the network device includes the BBU and the AAU. As shown in FIG. 3, the AAU may include a digital intermediate frequency (DIF), radio on chips (RoCs), and arrays.

The DIF may be configured to perform digital intermediate frequency processing, including upsampling, clipping processing, and the like.

The ROC may include ADC and DAC functions. For example, in a four-transmit four-receive (4Tx 4Rx, 4T4R) scenario, a base station includes four transceiver (TRX) channels, and needs to implement four channels of ADC and DAC through the RoC. The TRX channel includes a channel between the ROC and the array.

Each array may include a specific quantity of antenna elements. In FIG. 3, an example in which each array includes 512 antenna elements is used for description. During actual application, the base station may include another quantity of arrays, and each array may include another quantity of antenna elements. Each array may be obtained by splicing one or more antenna in package (AIP) chips. In this application, the AIP chip may be configured to adjust a frequency band (or referred to as a carrier) of the array.

As shown in FIG. 3, each array corresponds to one RoC, and the ROC may be configured to modulate a signal based on a bandwidth of the array. For example, both a bandwidth supported by an upper array and a bandwidth supported by a lower array shown in FIG. 3 are 400 megahertz (MHz), and the upper array and the lower array may be spliced to support a bandwidth of 800 MHz. In addition, if a frequency band f0 of the upper array is higher than a frequency band f1 of the lower array, the upper array may be configured to receive a radio frequency signal of the frequency band f0, where a frequency of the radio frequency signal is high, and RoC0 may be configured to convert the radio frequency signal corresponding to the frequency band f0 into a digital signal; the lower array may be configured to receive a radio frequency signal of the frequency band f1, where a frequency of the radio frequency signal is low, and RoC1 may be configured to convert the radio frequency signal corresponding to the frequency band f1 into a digital signal.

In addition, signal transmission may be performed between the RoC and the array through a plurality of TRX channels. The TRX channel may include a receiving channel (Rx) and a transmission channel (Tx). Rx may correspond to one receiver, and Tx may correspond to one transmitter. The receiver and the transmitter may be collectively referred to as a transceiver. For example, in FIG. 3, uplink transmission is used as an example. Each array is connected to a RoC corresponding to the array through four Rx channels. For example, RoC0 corresponds to Rxo to Rx3, and RoC1 corresponds to Rx4 to Rx7.

Currently, a terminal apparatus operating on a millimeter wave spectrum generally has a capability of supporting two component carriers (CCs). To be specific, the terminal apparatus supports carrier aggregation (CA) transmission on the two CCs, in other words, supports data sending and/or receiving on both the two component carriers, to improve uplink performance. A CC accessed by the terminal apparatus is a primary component carrier (PCC). On a base station side, one sector corresponds to one or more CCs, one CC corresponds to one cell, and a plurality of arrays form one sector. For example, each array of the network device may send signals of one or more CCs, in other words, may operate on the one or more CCs. A frequency band of one array may be obtained by splicing frequency bands of CCs corresponding to the array.

FIG. 3 is still used as an example. When only one terminal apparatus with a two-CC capability accesses the base station, or the base station schedules a plurality of terminal apparatuses to perform uplink transmission on the frequency band f0, the upper array can meet a requirement of the base station for receiving uplink transmission of the terminal apparatus. In this case, the lower array is in an idle state. When a part of the plurality of arrays are in an idle state, an array gain loss is caused. Consequently, uplink receiving performance is reduced. For example, if half of a total array is used and the rest part of the array is idle, an array gain loss is 3 decibels (dB) theoretically; if one-fourth of a total array is used and the rest part of the array is idle, an array gain loss is 6 dB theoretically; and so on.

In conclusion, embodiments of this application provide a communication method, to prevent an array from being in an idle state, and increase an array gain. The method may be implemented by a network device. The network device may be, for example, a base station or a component in the base station, and the component in the base station is, for example, a BBU, a DU, a processor, or a chip.

As shown in FIG. 4, an example in which the method is performed by the network device is used. The communication method provided in embodiments of this application may include the following steps.

S101: The network device determines a frequency band of a first radio on chip from a second frequency band and a third frequency band based on a first frequency band, uplink load, or an uplink resource. The first frequency band is a frequency band corresponding to a first CC accessed by a terminal apparatus, the second frequency band is the same as a frequency band of a second radio on chip, and the third frequency band is different from the second frequency band.

The uplink load is an uplink frequency domain occupation rate or a resource block (RB) occupation rate of the network device. FIG. 3 is used as an example. If both a frequency band of current RoC1 and a frequency band of current RoC1 are second frequency bands, the uplink load is uplink load in the second frequency band. If a frequency band of current RoC1 is different from a frequency band of current RoC1, the uplink load is uplink load in a combined bandwidth of the frequency band of RoC1 and the frequency band of RoC1.

The uplink resource is used to carry an uplink signal of the terminal apparatus, and the resource belongs to the second frequency band or the third frequency band. For example, the uplink resource is a scheduling resource indicated by the network device to the terminal apparatus by using uplink scheduling information, or the uplink resource may be a resource actually used by the terminal apparatus to send a radio signal.

The frequency band of the first radio on chip is all frequency bands supported by an array of the first radio on chip. The frequency band of the second radio on chip is all frequency bands supported by an array of the second radio on chip.

For example, as shown in FIG. 3, the first radio on chip is RoC1, and the second radio on chip is RoC1. The second frequency band is all frequency bands supported by the upper array corresponding to RoC1, and the frequency band of the first radio on chip is all frequency bands supported by the lower array corresponding to RoC1. For example, the upper array corresponds to a CC #1 and a CC #2, a frequency band of the CC #1 and a frequency band of the CC #2 are spliced into the frequency band corresponding to the upper array, that is, the second frequency band. The lower array corresponds to a CC #3 and a CC #4, and a frequency band of the CC #3 and a frequency band of the CC #4 are spliced into the frequency band of the first radio on chip.

Optionally, in this application, the network device may set the frequency band of the first radio on chip through an AIP chip. For example, a parameter used to implement the second frequency band and a parameter used to implement the third frequency band are preset, and the AIP chip is enabled to activate a corresponding parameter based on the frequency band that is of the first radio on chip and that is determined in S101. If it is determined in S101 that the second frequency band is the frequency band of the first radio on chip, the AIP chip is enabled to activate the parameter used to implement the second frequency band, so that the frequency band of the first radio on chip is the second frequency band. If it is determined in S101 that the third frequency band is the frequency band of the first radio on chip, the AIP chip is enabled to activate the parameter used to implement the third frequency band, so that the frequency band of the first radio on chip is the third frequency band. If the network device is a base station, a BBU of the base station may indicate the AIP chip to perform frequency band switching. If the network device is a BBU, the BBU may indicate the AIP chip to perform frequency band switching.

For example, if the network device determines that the frequency band of the first radio on chip is the second frequency band, but in this case, the frequency band of the first radio on chip is different from the second frequency band (where for example, the frequency band of the first radio on chip is currently the third frequency band), the network device may switch the frequency band of the first radio on chip to the second frequency band. If the frequency band of the first radio on chip is the second frequency band in this case, the frequency band of the first radio on chip does not need to be switched. For example, the network device may implement switching of the frequency band of the first radio on chip by changing the parameter activated by the AIP chip.

It should be understood that, in addition to performing S101, the network device may further configure the first frequency band for the terminal apparatus, to schedule the terminal apparatus to perform uplink transmission on signaling, data, and/or the like with the network device through the first frequency band. For example, the network device may send downlink signaling by using higher layer signaling, for example, a RRC message, or in another unicast, multicast, or broadcast manner.

S102: The network device receives the radio signal from the terminal apparatus through the first radio on chip and the second radio on chip.

As shown in FIG. 3, after determining the frequency band of RoC1 based on S101, the network device sets the frequency band of the lower array as the frequency band determined in S101, and performs uplink reception through both the upper array and the lower array corresponding to RoC1, to prevent the lower array from being idle.

According to the method shown in FIG. 4, the network device may dynamically determine the frequency band of the first radio on chip based on the uplink load of the network device, and perform uplink reception through the first radio on chip and the second radio on chip, to prevent the first radio on chip from being idle. This may increase an array gain, to obtain better uplink transmission performance.

The scenario shown in FIG. 3 is still used as an example. RoC1 and RoC1 each include four Rx channels. According to the method shown in FIG. 4, RoC1 (or the upper array) may be configured to perform reception through f0 (namely, the second frequency band), and RoC1 (or the lower array) may be configured to perform reception through f0 or f1 (namely, the third frequency band). As shown in FIG. 5, when both RoC0 and RoC1 are configured to perform uplink reception through f0, uplink reception of eight Rx channels may be implemented in a range of f0, and the array gain is increased; when RoC1 is configured to use f0, and RoC1 is configured to use f1, uplink reception of four Rx channels may be implemented in a range of (f0+f1), and uplink reception in a larger spectrum range is implemented. During actual application, the frequency band of RoC1 may be flexibly adjusted based on a range of the uplink resource of the terminal apparatus, to prevent the array corresponding to RoC1 from being idle.

In addition, that the first radio on chip and the second radio on chip can only be used to receive the radio signal is not limited in this application. If necessary, the network device may further send the radio signal through the first radio on chip and the second radio on chip.

The following describes implementations of S101 by using examples.

Manner 1: When the first frequency band belongs to the second frequency band, and the uplink load does not exceed a threshold, the network device may determine that the frequency band of the first radio on chip is the second frequency band.

For example, as shown in FIG. 3, if RoC1 corresponds to frequency bands of four CCs, and a bandwidth of a frequency band of each of the four CCs is 100 MHz, a bandwidth of the second frequency band corresponding to RoC1 is 400 MHz. If a PCC of the terminal apparatus is one of the four CCs, a first frequency band corresponding to the PCC is a part of the second frequency band, that is, the first frequency band belongs to the second frequency band.

Optionally, in this application, if a first condition is met, the network device may preferentially determine the PCC and/or an activated CC of the terminal apparatus from CCs corresponding to the second frequency band, in other words, set the first frequency band of the terminal apparatus to belong to the second frequency band, or preferentially configure the PCC and/or the activated CC of the terminal apparatus to correspond to a same array. The first condition includes that a quantity of terminal apparatuses connected to the network device does not exceed a specified value, and/or the uplink load of the network device does not exceed the threshold. The activated CC is a CC that is activated in a plurality of CCs (including the PCC) of the terminal apparatus. Therefore, when the uplink load does not exceed the threshold, the network device may set the frequency band of the first radio on chip to be the same as the frequency band of the second radio on chip, that is, set the frequency band as the second frequency band. In this case, the frequency band of the first radio on chip is the same as the frequency band of the second radio on chip, to prevent the array from being idle.

If the terminal apparatus supports a multi-CC capability, the network device may preferentially configure a plurality of CCs of the terminal apparatus on a same array. For example, as shown in FIG. 3, if the upper array supports at least the CC #1 and the CC #2, and the terminal apparatus supports a two-CC capability, the network device may configure a CC of the terminal apparatus as the CC #1 or the CC #2 in a registration process of the terminal apparatus, where the PCC of the terminal apparatus is the CC #1 or the CC #2. In this example, it is not excluded that a PCC of another terminal apparatus is the CC #1 or the CC #2. In other words, the network device may receive, through the upper array and the lower array, radio signals sent by a plurality of terminal apparatuses.

During implementation, a threshold of the uplink load may be based on a bandwidth of a frequency band on which the network device operates, or may be a manually specified value, a preset value, or a predefined value. This is not specifically limited in this application.

FIG. 3 is used as an example. Both a bandwidth of the upper array and a bandwidth of the lower array are 400 MHz. If the frequency bands of the upper array and the lower array are the same, the network device may receive uplink transmission of the terminal apparatus through eight Rx channels. This may increase an array gain in an uplink transmission process, improve uplink user experience in a light-load scenario and a medium-load scenario, and improve a user-perceived rate.

Manner 2: When the first frequency band is different from the second frequency band (for example, a part or all of frequencies in the first frequency band do not belong to the second frequency band), and uplink load of the first frequency band and the uplink load of the second frequency band do not exceed a threshold (which may be referred to as a switching threshold), the network device may determine that the frequency band of the first radio on chip is the second frequency band. In addition, the network device may set the frequency band of the terminal apparatus as the second frequency band (or switch the frequency band of the terminal apparatus to the second frequency band).

For example, as shown in FIG. 3, if RoC1 corresponds to frequency bands of four CCs, and a bandwidth of a frequency band of each of the four CCs is 100 MHz, a bandwidth of the second frequency band corresponding to RoC1 is 400 MHz. If a PCC of the terminal apparatus is a CC other than the four CCs, the first frequency band is different from the second frequency band.

In the manner 2, if any frequency in a frequency band of a first CC of the terminal apparatus does not belong to the second frequency band, and the uplink load of the second frequency band does not exceed the threshold, the network device may set the frequency band of the first radio on chip as the second frequency band, and indicate the terminal apparatus to switch from the first CC to a second CC, to set the frequency band of the terminal apparatus as a frequency band of the second CC, where the frequency band of the second CC belongs to the second frequency band. When indicating the terminal apparatus to switch from the first CC to the second CC, the network device may send first information to the terminal apparatus, where the first information may be switching information used to switch the terminal apparatus from the first CC to the second CC, and the first information may include information about the second CC.

FIG. 3 is still used as an example. CCs of the terminal apparatus include the CC #2 and the CC #3, CCs corresponding to the upper array of the network device include the CC #1 and the CC #2, and CCs corresponding to the lower array include the CC #3. In this case, when uplink load of frequency bands corresponding to the CC #1 to the CC #3 does not exceed the threshold, the network device may switch the terminal apparatus from the CC #3 to the CC #2, and configure the frequency band corresponding to the lower array to be the same as the frequency band corresponding to the upper array. Therefore, the network device may receive uplink transmission of the terminal apparatus through eight Rx channels. In this example, it is not excluded that a PCC of another terminal apparatus is the CC #1 or the CC #2. In other words, the network device may receive, through the upper array and the lower array, radio signals sent by a plurality of terminal apparatuses.

It should be understood that the foregoing manner 1 and manner 2 may be implemented in a semi-static manner. To be specific, after the frequency band of the first radio on chip is determined and configured, the radio signal is received and sent based on the frequency band determined this time. For example, after the frequency band of the first radio on chip is configured as the second frequency band in the semi-static manner, the network device collects statistics on an uplink load status, and when the load reaches or exceeds the threshold, the frequency band of the first radio on chip is configured as the third frequency band.

Manner 3: The network device may determine, based on a specific time unit and an uplink resource in the time unit, a frequency band of the first radio on chip in the time unit, and implement dynamic configuration based on the time unit. Specifically, the network device may determine, based on a status of scheduling, in a first time unit, the terminal apparatus to perform uplink transmission, a frequency band of the first radio on chip in the first time unit.

For example, when uplink resources of all terminal apparatuses that perform uplink sending in the first time unit all belong to the second frequency band, the frequency band of the first radio on chip may be set as the second frequency band. In this case, both the frequency band of the first radio on chip and the frequency band of the second radio on chip are second frequency bands. Otherwise, when an uplink resource of any terminal apparatus belongs to the third frequency band, the frequency band of the first radio on chip in the first time unit is set as the third frequency band. In this case, the frequency band of the first radio on chip and the frequency band of the second radio on chip are respectively the second frequency band and the third frequency band. Beyond the first time unit, the frequency band of the first radio on chip needs to be re-determined, or a frequency band that is of the first radio on chip and that is configured by default is used. In this application, the time unit may be a slot, a mini-slot, a symbol, or a combination of a plurality of slots or symbols.

During implementation, the network device may determine the frequency band of the first radio on chip in the first time unit based on an uplink resource of at least one terminal apparatus in the first time unit, and perform, in the first time unit through the first radio on chip and the second radio on chip, uplink reception on a radio signal sent by the at least one terminal apparatus. In this application, the network device may schedule the terminal apparatus to perform uplink transmission on the uplink resource. For example, the network device schedules, by using signaling carried on a physical uplink shared channel (PUSCH) or a physical uplink control channel (PUCCH), the terminal apparatus to perform uplink transmission by using the uplink resource in the first time unit.

For example, as shown in FIG. 3, if RoC1 corresponds to frequency bands of four CCs, and a bandwidth of a frequency band of each of the four CCs is 100 MHz, a bandwidth of the second frequency band corresponding to RoC1 is 400 MHz. Similarly, a bandwidth of the frequency band corresponding to RoC1 is 400 MHz. If in the first time unit, the network device schedules all terminal apparatuses to perform uplink transmission on the second frequency band, the network device may configure the frequency band of RoC1 as the second frequency band, so that both RoC1 and RoC1 perform uplink reception through the second frequency band. If in the first time unit, the network device schedules at least one terminal apparatus to perform uplink transmission on the second frequency band, and schedules at least one terminal apparatus to perform uplink transmission on the third frequency band, the network device may configure the frequency band of RoC1 as the third frequency band.

In the foregoing manner 3, the network device may dynamically configure the frequency band of the first radio on chip in different time units, to further improve flexibility of setting the frequency band for reception, to meet receiving requirements in different scenarios.

The foregoing manner 1 to manner 3 are merely examples of descriptions of the method provided in this embodiment of this application. It should not be understood as that the step shown in S101 needs to be implemented in the foregoing manner 1 to manner 3. A person skilled in the art may further extend another implementation based on the foregoing descriptions. For example, when the uplink load of the second frequency band reaches or exceeds the threshold, the frequency band of the first radio on chip is set as the third frequency band, to prevent the second radio on chip from operating in an overload state, which results in an uplink packet loss.

Figure 6:
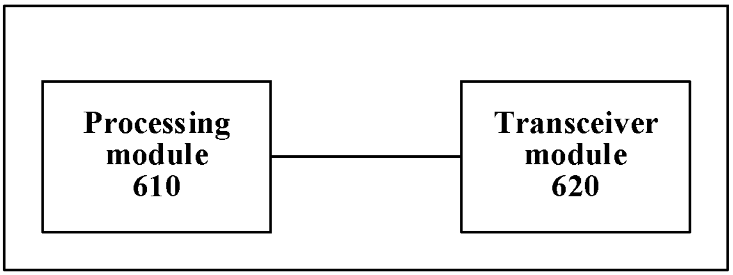
FIG. 6 is a schematic diagram of a structure of a communication apparatus according to this application.
Figure 7:
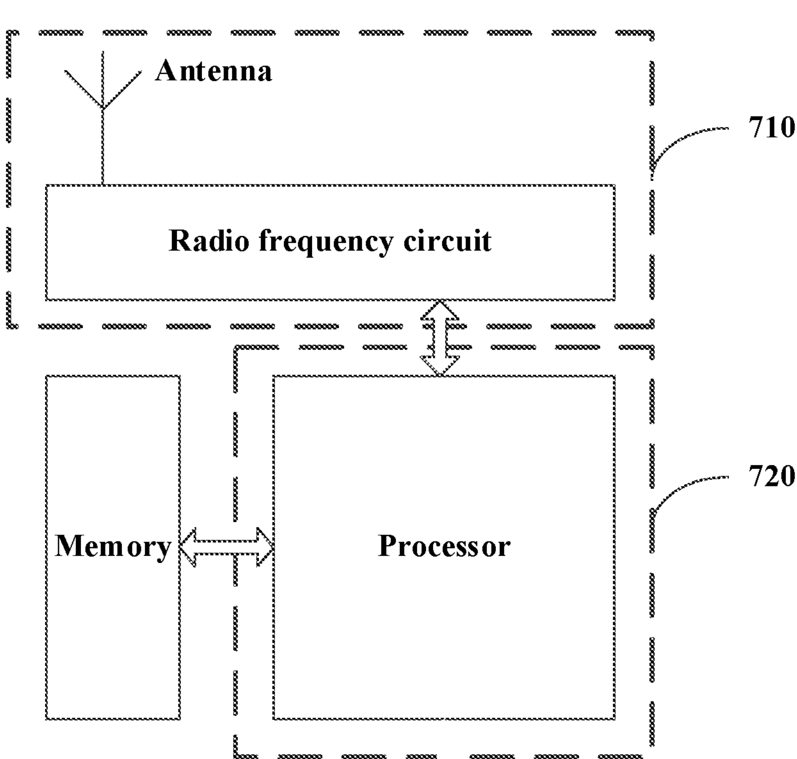
FIG. 7 is a schematic diagram of a structure of another communication apparatus according to this application.

FIG. 6 and FIG. 7 are schematic diagrams of structures of communication apparatuses according to embodiments of this application. The communication apparatus is configured to implement the communication method provided in embodiments of this application. It should be understood that the communication apparatus may be configured to implement an action performed by the network device in embodiments of this application.

For example, FIG. 6 is a schematic diagram of a structure of a possible communication apparatus. The structure may include a processing module (or a processing unit) 610 and a transceiver module (or a transceiver unit) 620. For example, the structure shown in FIG. 6 may be a network device, for example, a base station or a BBU, or may be a chip used in the network device, or another combined device, a component (or referred to as an assembly), or the like that has a function of the network device shown in this application. When the structure is the network device, the transceiver module 620 may be a transceiver. The transceiver may include a communication interface, an antenna, a radio frequency circuit, or the like, and is configured to support the communication apparatus in performing communication in a wired and/or a wireless manner. The processing module 610 may be a processor, for example, includes one or more central processing units (CPUs). When the structure is the component that has the function of the network device shown in this application, the transceiver module 620 may be an interface circuit, and the processing module 610 may be a processor. When the structure is a chip system, the transceiver module 620 may be an input/output interface of a chip (for example, a baseband chip), and the processing module 610 may be a processor of the chip system, and may include one or more central processing units. It should be understood that the processing module 610 in this embodiment of this application may be implemented by the processor or a processor-related circuit component, and the transceiver module 620 may be implemented by a transceiver or a transceiver-related circuit component.

For example, the processing module 610 may be configured to perform all operations, such as a processing operation, except receiving and sending operations, performed by the network device in any embodiment of this application, and/or configured to support another process of the technology described in this specification, for example, generate a message, information, and/or signaling sent by the transceiver module 620, and process the message, information, and/or signaling received by the transceiver module 620. The transceiver module 620 may be configured to perform all receiving and sending operations performed by the network device in any embodiment of this application, and/or configured to support another process of the technology described in this specification, for example, data sending and/or receiving.

In addition, the transceiver module 620 may be a functional module, and the functional module can complete both a sending operation and a receiving operation. For example, the transceiver module 620 may be configured to perform all sending operations and receiving operations performed by the network device. For example, when performing the sending operation, the transceiver module 620 may be considered as a sending module, and when performing the receiving operation, the transceiver module 620 may be considered as a receiving module. Alternatively, the transceiver module 620 may be two functional modules. The transceiver module 620 may be considered as a collective name of the two functional modules. The two functional modules are respectively a sending module and a receiving module. The sending module is configured to complete the sending operation. For example, the sending module may be configured to perform all sending operations performed by the network device. The receiving module is configured to complete the receiving operation, and the receiving module may be configured to perform all receiving operations performed by the network device.

For example, the processing module 610 may be configured to determine a frequency band of a first radio on chip from a second frequency band and a third frequency band based on at least one of a first frequency band, uplink load, or an uplink resource, where the first frequency band is a frequency band corresponding to a first component carrier of a terminal apparatus, the second frequency band is the same as a frequency band of a second radio on chip, the third frequency band is different from the second frequency band, and the uplink resource is used to carry a radio signal of the terminal apparatus. The transceiver module 620 may be configured to receive the radio signal from the terminal apparatus through the first radio on chip and the second radio on chip.

In a possible design, the uplink load is uplink load of the second frequency band. When the first frequency band belongs to the second frequency band, and the uplink load does not exceed a threshold, the processing module 610 may determine that the frequency band of the first radio on chip is the second frequency band.

In a possible design, the uplink load is uplink load of a combination of the second frequency band and the third frequency band. When a part or all of frequencies in the first frequency band do not belong to the second frequency band, and the uplink load does not exceed a threshold, the processing module 610 may determine that the frequency band of the first radio on chip is the second frequency band. The transceiver module 620 may further send first information to the terminal apparatus, where the first information is used to switch the terminal apparatus from the first component carrier to a second component carrier, and a frequency band corresponding to the second component carrier is the second frequency band.

In a possible design, there are a plurality of terminal apparatuses. If the uplink resource in a first time unit belongs to the second frequency band, the processing module 610 may determine that the frequency band of the first radio on chip in the first time unit is the second frequency band. The transceiver module 620 may receive the radio signal from the terminal apparatus through the first radio on chip and the second radio on chip in the first time unit.

In a possible design, the processing module 610 may set the frequency band of the first radio on chip as the second frequency band using an antenna in package chip.

In a possible design, when a first condition is met, the processing module 610 determines primary component carriers and/or activated component carriers of a plurality of terminal apparatuses from component carriers corresponding to the second frequency band. The first condition includes at least one of the following: a quantity of connected terminal apparatuses does not exceed a specified value; or the uplink load does not exceed the threshold.

For example, if the network device is a BBU, the transceiver module 620 may include an interface used for communication between the BBU and an AAU. If the network device is a base station including an AAU, the transceiver module 620 may include the AAU.

FIG. 7 is a schematic diagram of a structure of another communication apparatus, configured to perform an action performed by the network device according to embodiments of this application. As shown in FIG. 7, the communication apparatus may include a processor and a memory. The processor is mainly configured to: process a communication protocol and communication data, and control the communication apparatus to execute a software program, process data of the software program, and the like. The memory is mainly configured to store the software program and the data. A communication interface is mainly used for communication between network devices.

If the network device is a base station, as shown in FIG. 7, the communication apparatus may further include an antenna and a radio frequency circuit, and is configured to perform communication in a wireless communication manner. For example, the network device may send a downlink radio signal through the antenna and the radio frequency circuit, and receive an uplink radio signal. When data (or information or a signal) needs to be sent, the processor of the communication apparatus may further perform baseband processing on the to-be-sent data, and output a baseband signal to the radio frequency circuit. After performing radio frequency processing on the baseband signal, the radio frequency circuit sends the radio frequency signal in a form of an electromagnetic wave through the antenna. When data (or information or a signal) is sent to the communication apparatus, the radio frequency circuit receives the radio frequency signal through the antenna, converts the radio frequency signal into the baseband signal, and outputs the baseband signal to the processor. The processor converts the baseband signal into data and processes the data. In this case, the antenna and/or the radio frequency circuit with a transceiver function may be considered as a transceiver unit of the communication apparatus. If the network device is a BBU, the antenna and the radio frequency circuit may be located in an AAU. In this case, the transceiver unit may include a communication interface, and the communication interface may be used for communication between the BBU and the AAU.

In this application, the transceiver unit may be a functional unit, and the functional unit can implement a sending function and a receiving function. Alternatively, the transceiver unit may include two functional units: a receiving unit that can implement a receiving function and a sending unit that can implement a sending function. The processor with a processing function may be further considered as a processing unit of the communication apparatus. The base station is used as an example for some embodiments. As shown in FIG. 7, the communication apparatus may include a transceiver unit 710 and a processing unit 720. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 710 and that is configured to implement the receiving function may be considered as a receiving unit, and a component that is in the transceiver unit 710 and that is configured to implement the sending function may be considered as a sending unit. That is, the transceiver unit 710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like. In addition, if the network device is the BBU, the antenna and the radio frequency unit in FIG. 7 may be replaced with the communication interface.

It should be understood that the transceiver unit 710 may correspond to the transceiver module 620, or the transceiver module 620 may be implemented by the transceiver unit 710. The transceiver unit 710 is configured to perform the sending operation and the receiving operation of the network device in embodiments of this application, and/or is configured to support another process of the technology described in this specification. The processing unit 720 may correspond to the processing module 610, or the processing module 610 may be implemented by the processing unit 720. The processing unit 720 is configured to perform other operations of the network device in embodiments of this application except the receiving and sending operations, for example, configured to perform all operations performed by the network device in embodiments of this application except the receiving and sending operations, and/or configured to support another process of the technology described in this specification. For an action performed by the processing unit 720, refer to the foregoing action performed by the processing module 610. For an action performed by the transceiver unit 710, refer to the foregoing action performed by the transceiver module 620.

For ease of description, only one memory and one processor are shown in FIG. 7. In an actual communication apparatus, there may be one or more processors and one or more memories. The memory may also be referred to as a storage medium, a storage device, or the like. The memory may be disposed independent of the processor, or may be integrated with the processor. This is not limited in embodiments of this application.

It should be understood that the communication apparatus may be specifically the base station or the BBU, or may be a chip or a chip system used in the base station or the BBU.

All or a part of the foregoing embodiments may be implemented by software, hardware (for example, a circuit), firmware, or any combination thereof. When the software is used for implementing embodiments, the foregoing embodiments may be implemented completely or partially in a form of a computer program product. The computer program product includes one or more computer instructions or computer programs. When the computer instructions or the computer programs are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

Embodiments of the present invention is described with reference to the flowcharts and/or block diagrams of the method, the device (or a system), and the computer program product according to embodiments of the present invention. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

The computer program instructions may be stored in a computer-readable memory that can instruct the computer or another programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to embodiments of the present invention without departing from the spirit and scope of this application. This application is intended to cover these modifications and variations provided that the modifications and variations of embodiments of this application fall within the scope defined by the following claims and their equivalent technologies in this application.

What is claimed is:

1. A method, comprising:

determining, by a network device, a frequency band of a first radio on chip from a second frequency band and a third frequency band based on at least one of a first frequency band, an uplink load, or an uplink resource, wherein an active antenna unit of the network device comprises a plurality of antenna arrays coupled to a plurality of radio on chips, the plurality of radio on chips comprises the first radio on chip and a second radio on chip, wherein the first frequency band comprises a frequency band corresponding to a first component carrier of a terminal apparatus, wherein the second frequency band is the same as a frequency band of the second radio on chip, wherein the third frequency band is different from the second frequency band, and wherein the uplink resource carries a radio signal of the terminal apparatus; and receiving, from the terminal apparatus, the radio signal through the first radio on chip and the second radio on chip;

wherein the uplink load comprises an uplink load of a combination of the second frequency band and the third frequency band, and determining, by the network device, the frequency band of the first radio on chip from the second frequency band and the third frequency band based on the first frequency band and the uplink load comprises:

in response to a part or all of frequencies in the first frequency band not belonging to the second frequency band, and the uplink load not exceeding a threshold, determining that the frequency band of the first radio on chip is the second frequency band, and the method further comprising:

sending first information to the terminal apparatus, wherein the first information is used to switch the terminal apparatus from the first component carrier to a second component carrier, and wherein the second frequency band comprises a frequency band corresponding to the second component carrier.

2. The method according to claim 1, further comprising:

setting the frequency band of the first radio on chip as the second frequency band using an antenna in package chip.

3. The method according to claim 1, further comprising:

in response to a first condition being met, determining at least one of primary component carriers or activated component carriers of a plurality of terminal apparatuses from component carriers corresponding to the second frequency band, wherein the first condition comprises at least one of:

a quantity of connected terminal apparatuses does not exceed a specified value; or the uplink load does not exceed the threshold.

4. The method according to claim 1, wherein the uplink load is an uplink frequency domain occupation rate or a resource block occupation rate of the network device.

5. The method according to claim 1, wherein the network device comprises at least one of a base station, a baseband unit, a distributed unit, or a chip used in the base station.

6. The method according to claim 1, wherein the uplink load is a resource block occupation rate of the network device.

7. The method according to claim 1, wherein the network device is a base station.

8. An apparatus applied to a network device, comprising:

at least one processor; and at least one non-transitory computer-readable memory connected to the at least one processor and including computer program code, wherein the at least one non-transitory computer-readable memory and the computer program code are configured, with the at least one processor, to cause the apparatus to:

determine a frequency band of a first radio on chip from a second frequency band and a third frequency band based on at least one of a first frequency band, an uplink load, or an uplink resource, wherein an active antenna unit of the network device comprises a plurality of antenna arrays coupled to a plurality of radio on chips, the plurality of radio on chips comprises the first radio on chip and a second radio on chip, wherein the first frequency band comprises a frequency band corresponding to a first component carrier of a terminal apparatus, wherein the second frequency band is the same as a frequency band of the second radio on chip, wherein the third frequency band is different from the second frequency band, and wherein the uplink resource is used to carry a radio signal of the terminal apparatus; and receive, from the terminal apparatus, the radio signal through the first radio on chip and the second radio on chip;

wherein the uplink load comprises an uplink load of a combination of the second frequency band and the third frequency band, and determining the frequency band of the first radio on chip from the second frequency band and the third frequency band based on the first frequency band and the uplink load comprises:

in response to a part or all of frequencies in the first frequency band not belonging to the second frequency band, and the uplink load not exceeding a threshold, determining that the frequency band of the first radio on chip is the second frequency band, and wherein the at least one non-transitory computer-readable memory and the computer program code are configured, with the at least one processor, to cause the apparatus to:

send first information to the terminal apparatus, wherein the first information is used to switch the terminal apparatus from the first component carrier to a second component carrier, and wherein the second frequency band comprises a frequency band corresponding to the second component carrier.

9. The apparatus according to claim 8, wherein the computer program code further instructs the at least one processor to:

set the frequency band of the first radio on chip as the second frequency band using an antenna in package chip.

10. The apparatus according to claim 8, wherein the computer program code further instructs the at least one processor to:

in response to a first condition being met, determine at least one of primary component carriers or activated component carriers of a plurality of terminal apparatuses from component carriers corresponding to the second frequency band, wherein the first condition comprises at least one of:

a quantity of connected terminal apparatuses does not exceed a specified value; or the uplink load does not exceed the threshold.

11. The apparatus according to claim 8, wherein the network device comprises at least one of a base station, a baseband unit, a distributed unit, or a chip used in the base station.

12. The apparatus according to claim 8, wherein the uplink load is an uplink frequency domain occupation rate of the network device.

13. The apparatus according to claim 8, wherein the uplink load is a resource block occupation rate of the network device.

14. A non-transitory computer readable storage medium storing instructions that are executable by at least one processor, wherein when the instructions are executed, a network device is caused to:

determine a frequency band of a first radio on chip from a second frequency band and a third frequency band based on at least one of a first frequency band, an uplink load, or an uplink resource, wherein an active antenna unit of the network device comprises a plurality of antenna arrays coupled to a plurality of radio on chips, the plurality of radio on chips comprises the first radio on chip and a second radio on chip, wherein the first frequency band comprises a frequency band corresponding to a first component carrier of a terminal apparatus, wherein the second frequency band is the same as a frequency band of the second radio on chip, wherein the third frequency band is different from the second frequency band, and wherein the uplink resource is used to carry a radio signal of the terminal apparatus; and receive, from the terminal apparatus, the radio signal through the first radio on chip and the second radio on chip;

wherein the uplink load comprises an uplink load of a combination of the second frequency band and the third frequency band, and determining the frequency band of the first radio on chip from the second frequency band and the third frequency band based on the first frequency band and the uplink load comprises:

in response to a part or all of frequencies in the first frequency band not belonging to the second frequency band, and the uplink load not exceeding a threshold, determining that the frequency band of the first radio on chip is the second frequency band, and wherein when the instructions are executed, the network device is further caused to:

send first information to the terminal apparatus, wherein the first information is used to switch the terminal apparatus from the first component carrier to a second component carrier, and wherein the second frequency band comprises a frequency band corresponding to the second component carrier.

15. The non-transitory computer readable storage medium according to claim 14, wherein when the instructions are executed, the network device is caused to:

set the frequency band of the first radio on chip as the second frequency band using an antenna in package chip.

16. The non-transitory computer readable storage medium according to claim 14, wherein when the instructions are executed, the network device is caused to:

in response to a first condition being met, determine at least one of primary component carriers or activated component carriers of a plurality of terminal apparatuses from component carriers corresponding to the second frequency band, wherein the first condition comprises that a quantity of connected terminal apparatuses does not exceed a specified value.

17. The non-transitory computer readable storage medium according to claim 14, wherein when the instructions are executed, the network device is caused to:

in response to a first condition being met, determine at least one of primary component carriers or activated component carriers of a plurality of terminal apparatuses from component carriers corresponding to the second frequency band, wherein the first condition comprises that the uplink load does not exceed the threshold.

18. The non-transitory computer readable storage medium according to claim 14, wherein the network device comprises at least one of a base station, a baseband unit, a distributed unit, or a chip used in the base station.

19. The non-transitory computer readable storage medium according to claim 14, wherein the uplink load is an uplink frequency domain occupation rate of the network device.

20. The non-transitory computer readable storage medium according to claim 14, wherein the uplink load is a resource block occupation rate of the network device.

* * * * *